United States Patent Office 3,470,871
Patented Oct. 7, 1969

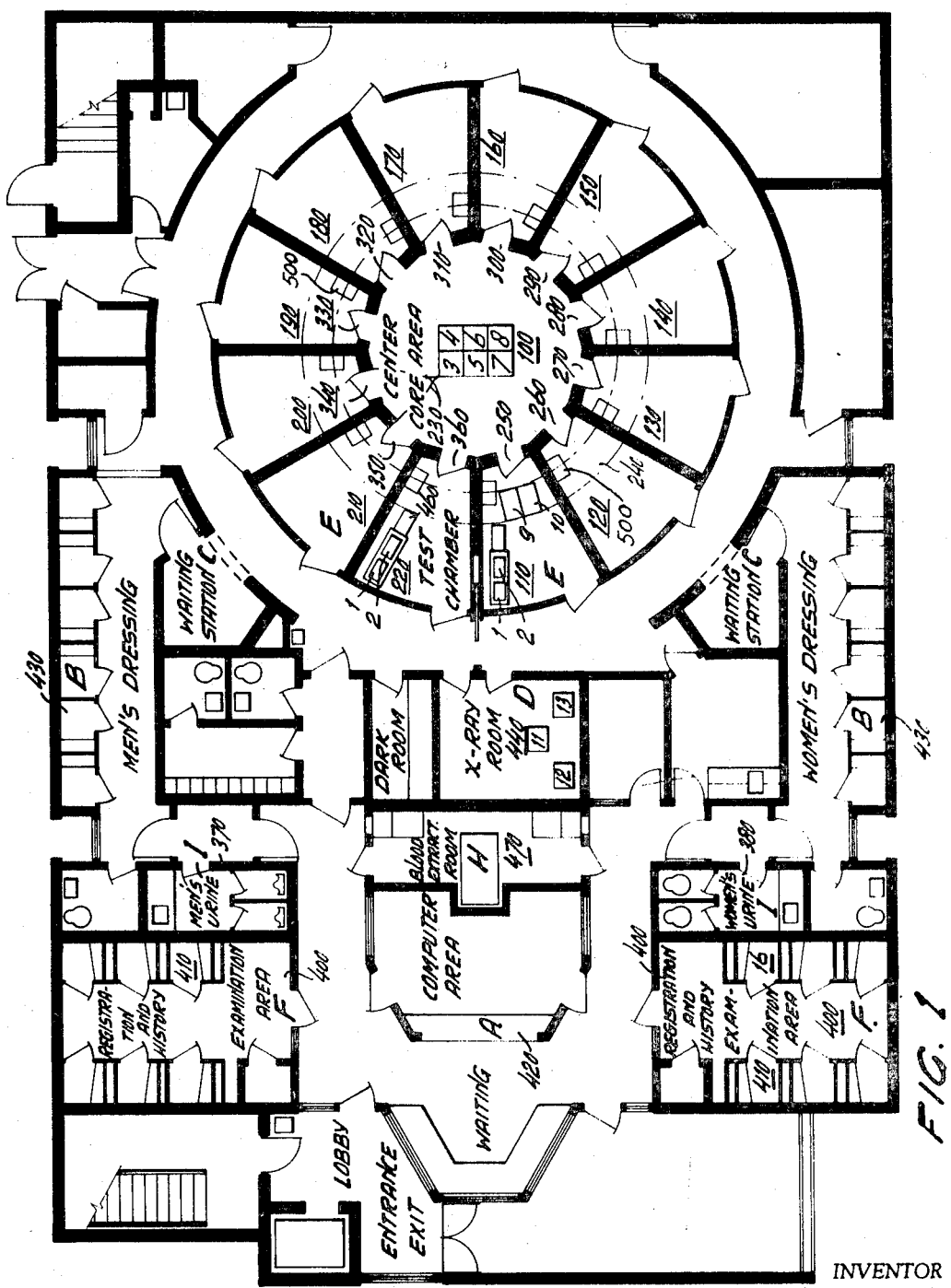

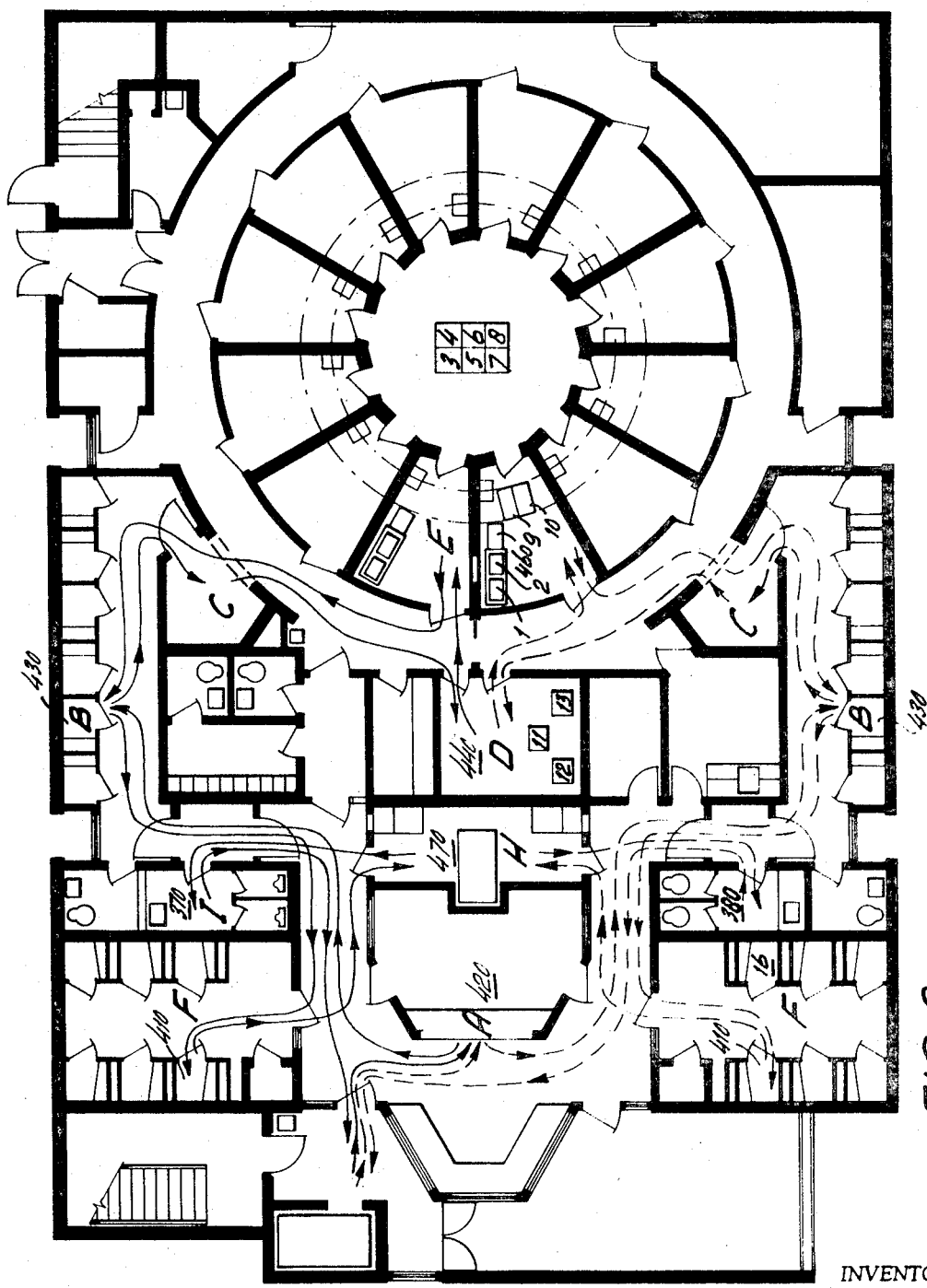

3,470,871
MULTIPHASIC SCREENING LABORATORY FOR CONDUCTING MEDICAL EXAMINATIONS
Ramon Shoen, Scottsdale, Ariz., assignor to Arcoa, Incorporated, a corporation of Oregon
Filed Nov. 13, 1968, Ser. No. 775,419
Int. Cl. A61b 5/10; E04h 14/00
U.S. Cl. 128—2      1 Claim

ABSTRACT OF THE DISCLOSURE

Multiphasic screening laboratory for conducting medical examinations in which the test sequence phase is separated from the self-administered history phase, characterized by twelve wedge shaped test chambers surrounding a central core area, each test chamber containing all instruments and leads to perform pre-determined tests, inexpensive instruments being located in each test chamber while expensive equipment being located in the central core and connected to each test chamber via cable, still further expensive equipment being mounted on a track at the core periphery and supplied to each chamber via connecting doorway, and/or still farther expensive equipment being mounted on a circular track traveling over the top of the wedge shaped test chambers and supplied to each chamber by descending through door in the ceiling.

BACKGROUND OF THE INVENTION

Existing multiphasic screening is normally performed by arranging each test in a separate room or "station." The patient starts at a first station and walks through the laboratory from station to station until he arrives at the end of the test sequence. The patients receive one or more medical tests at each station. The test results are transferred to IBM cards which are subsequently fed into a computer. The computer organizes the test data and prints out a summary which is suitable for evaluation by a physician.

Close examination of the methods and functional layout of existing multiphasic systems reveals the following undesirable characteristics:

The subjects are required to repeatedly walk, wait, sit down, get up, go in and out of rooms, get on and off tables, as they move from station to station during the test sequence. These movements are time consuming and waste not only the technician's time but the subject's as well. Furthermore, time is wasted when different tests require different time intervals. A test that requires only a brief period must be allocated the same amount of time as a longer procedure. Although an attempt is made to compensate for these factors by having the subjects complete questionnaire forms during idle moments, this is most distracting. Those tests that require longer time periods, such as audiometry, are duplicated. There is no way to sequence the tests for maximum efficiency.

Once the flow of subjects begins, it is very difficult for medical personnel to be relieved. It is virtually impossible to stop the flow since there is no way of knowing when a particular subject will arrive at a station. Although it is possible to relieve each technician in sequence, which may be satisfactory for coffee breaks, this would require extrapersonnel and be impossible for lunch periods. At present, this is compensated for by running continuously and never stopping the flow of subjects during a test day.

The maximum capacity of present systems is limited to approximately 120 subjects per shift. This is calculated by allowing a 3.5 minute test interval over a net work period of seven (7) hours per shift.

The subject is confronted with a different technician at each station. This is not desirable because the subject and each technician must be introduced to one another and a satisfactory interpersonal relationship established. Also, supervision of the subject is highly fragmented.

The technicians repeatedly perform the same test. Although, this should make the technicians efficient at performing the single procedure, job fatigue and boredom is likely to offset this possible gain. Job satisfaction and motivation of the technician most probably is lessened.

Many patient dependent operations occur during the actual test sequence; i.e. undressing, dressing, questionnaire answering, urine collection. This results in more wasted time, inefficiency, fragmentation and loss of control during the test sequence.

In present systems, inefficient use is made of space since many hallways and rooms of odd shapes and sizes are required, creating a maze-like appearance.

SUMMARY OF THE INVENTION

The system of the present invention separates the test sequence phase from the history phase.

Test sequence phase

Virtually the entire test sequence is performed in a single test chamber by one technician. This is accomplished by arranging twelve (12) wedge shaped test chambers in a circular configuration around a central core area. Each test chamber associated with the central core contains all the instruments and connecting leads to perform all the predetermined tests. Inexpensive instruments, such as used in visual acuity and tonometry, for example, are provided in each test chamber. Expensive equipment, such as audiometer, electrocardiograph and blood pressure, pulse, temperature and respiration measuring devices, is located in the central core and connected to each test chamber via a cable. Other expensive equipment, such as spirometer and fundus camera, is mounted on a circular track at the extreme periphery of the core and supplied to each chamber via the connecting doorway and/or mounted on a circular track traveling over the top of the test chambers and supplied to each chamber by descending through a door in the ceiling. Thirty (30) minutes are allowed to complete each test sequence. By having each subject enter the adjacent test chamber five (5) minutes after the preceding subject (counterclockwise), each core or track mounted instrument is available to each chamber for a five (5) minute interval. Thus, each set of equipment can serve a maximum of six (6) chambers, which operating over a net seven hour shift can serve eighty-four (84) subjects. If all twelve (12) test chambers were operating, then 168 subjects could be handled. The chest X-ray, height and weight are performed in a separate room immediately prior to entering the test chambers. After the history phase, for example, blood is drawn and urine specimen completed one hour after glucose ingestion.

History phase

The history phase is performed in two rectangular rooms with six (6) or more individual questionnaire booths located along the periphery of each room. A centrally located counter outside the history rooms serves as a registration desk and also supervises the subjects during the history phase. Questionnaire booths are provided with a floor channel around the periphery to allow for cable installation if a computer based history or other device becomes feasible.

DESCRIPTION OF THE DRAWINGS

FIG. 1 is a floor plan illustrating the entire layout of the present multiphasic screening laboratory identifying each room and related medical test equipment schematically; and FIG. 2 is an enlarged section of the floor plan illustrating particularly the test sequence and passage of men (solid arrows) and women (broken arrows).

DESCRIPTION OF THE PREFERRED EMBODIMENTS

The layout of the present multiphasic screening invention, as illustrated in FIGS. 1 and 2, features a central core 100 around which are arranged twelve (12) wedge shaped test chambers, 110–220, access to central core 100 from test chambers 110–220 being provided by connecting doors 250–360, respectfully.

Within each test chamber is located inexpensive instrumentation, schematically designated by reference numerals on the drawings, for performing the following tests:
Reference numeral 1: visual acuity (Project-O-Chart (AO) through mirror to screen)

Reference numeral 2: tonometry (Schiotz Tonometer and Ophthaine Anesthetic)

Within the central core 100 is located expensive equipment, schematically designated by reference numerals on the drawings, as follows:

Reference numeral 3: audiometer (Rudmose ARJ–4A)
Reference numeral 4: electrocardiograph
Reference numeral 5: blood pressure measuring device
Reference numeral 6: pulse measuring device
Reference numeral 7: temperature measuring device
Reference numeral 8: respiration measuring device Each of the central core measuring devices 3–8 is connected to each test chamber via cable 230. (One set of cables for each test chamber.)

Further expensive equipment is mounted on track 240 located at the extreme periphery of core 100, and/or over the test chambers schematically designated by reference numerals on the drawings, as follows:

Reference numeral 9: spirometer (Med-Science—Model 470)
Reference numeral 10: fundus camera (Carl Zeiss)

Spirometer 9 and fundus camera 10, being mounted on track 240 are supplied to each of the test chambers 110–220 via identical connecting doors 500.

A separate room is provided for the following equipment, schematically designated by reference numerals on the drawings, as follows:

Reference numeral 11: chest X-ray
Reference numeral 12: height measurement
Reference numeral 13: weight measurement Men's and women's urine specimens are obtained in rooms 370 and 380.

The history examination area is designated generally by reference numeral 400 and consists of two rectangular areas providing twelve or more individual questionnaire booths, designated by reference numeral 410. Registration desk 420 is centrally located permitting supervision of the subjects during the history phase, while providing them with the necessary information prior to departure.

The operation of the present multiphasic screening system follows with reference to FIG. 2 of the drawings in which single arrows designate the passage of men and broken arrows the passage of women.

In each case, the subject registers at desk 420 (station A) and is instructed to proceed to the appropriate dressing room 430 (station B) to change into a disposable examination gown. The subject then enters the test area. This is the critical timing point, as the subject must be available in the test area at the beginning of the thirty (30) minute test interval. If the subject arrives early, he waits at station C.

The subject is then greeted by a technician and both proceed to nearby room 440 containing X-ray cassette 11 and height and weight measuring equipment 12 and 13 respectively. Height and weight are instantaneously measured as the subject stands before cassette 11 as the X-ray is snapped.

The subject and technician then proceed to a test chamber (station E) in which the following tests are performed by the previously identified instruments:

visual acuity (instrument 1, subject sitting on end of examining table 460)
tonometry (instrument 2, subject lying on examining table 460, drop instilled in right eye to dilate pupil)
electrocardiogram (instrument 4, E.C.G. electrodes, P.T.R. transducers applied and recorded)
blood pressure (instrument 5)
pulse (instrument 6)
temperature (instrument 7)
respiration (instrument 8)
audiometry (instrument 3)
glucose ingestion
spirometer (instrument 9)
retinal photo (instrument 10)
other tests as they become available and proper for screening purposes.

Thereafter, the subject returns to dressing room 430 (station B). After dressing, the subject proceeds to the history area and completes a self-administered or computer based history (station F).

One hour after glucose ingestion, blood is drawn in room 470 (station H) and urine specimen completed in rooms 370/380 (station I). Finally, the subject leaves the laboratory.

The same sequence of operations is followed for women, as will be apparent from FIG. 2 of the drawings.

As will be apparent, the advantages of the present multi-phasic screening concept, characterized by the multiple test chambers radiating from a central core with separate history area, may be summarized as follows:

(1) No waiting, walking or unnecessary physical movements. Test time is reduced to a minimum and efficiency is maximum because the subject remains stationary while the instrumentation is grouped around him. A single Paramedic is able to perform each test in rapid sequence, much more acceptable from the subject's point of view.

(2) The system is compatible with a computer based history since the subject is interrupted only once for a blood draw and urine specimen. This single interruption can be scheduled to occur from 45 to 60 minutes after the history is started. A practical computer history would be completed within this time period.

(3) The system is compatible with lunch and coffee breaks. The subjects are simply not scheduled to enter the test chamber during these periods.

(4) Large capacity: Since each test chamber can process fourteen (14) subjects per shift, the disclosed twelve (12) test chambers process 168 subjects.

(5) Patient dependent operations do not interfere with the test sequence.

(6) Since a single Paramedic performs the entire test sequence, her tasks are varied and she becomes a Paramedic in the true sense of the word. With experience and training, she may become a skilled observer of signs of disease.

(7) Flexibility: The large majority of present and future screening tests can be performed using the "multiple test chamber and central core" principle. However, those tests that require a separate room can easily be performed after the test chamber sequence in the peripheral rooms.

(8) Personnel: The system reduces labor cost by one-third to one-half.

(9) Maximum utilization of floor space.

(10) Entire subject flow time is one and one half to two hours. Present laboratories require two and one half to three hours.

I claim:
1. A multiphasic screening laboratory, comprising:
(A) a central core;
(B) a plurality of wedge shaped test chambers surrounding said central core, each test chamber including:
   (i) an inner door opening into said core;
   (ii) an outer door; and
   (iii) a ceiling door;
(C) a corridor surrounding said test chamber and accessible through said outer doors;
(D) medical testing equipment located within said central core and operatively connected to said test chambers;
(E) medical testing equipment located within each of said test chambers;
(F) a circular track supported upon the ceiling of said test chambers; and
(G) medical testing equipment transportable upon said track and extensible into said test chambers via said ceiling door in each chamber.

References Cited

UNITED STATES PATENTS

| | | | |
|---|---|---|---|
| 1,837,152 | 12/1931 | Ellsworth | 52—64 |
| 2,927,599 | 3/1960 | Stetson | 52—234 XR |
| 3,068,534 | 12/1962 | Hu | 52—90 |
| 3,129,704 | 4/1964 | Burt | 128—2.1 |
| 3,220,382 | 11/1965 | Carpenter | 128—1 |
| 3,280,817 | 10/1966 | Jorgensen et al. | 128—2.05 |

FOREIGN PATENTS 501,450  4/1920  France.

OTHER REFERENCES

Coronary Monitoring, Lexington Instruments Corp., Jan. 3, 1968.

RICHARD A. GAUDET, Primary Examiner

KYLE L. HOWELL, Assistant Examiner

U.S. Cl. X.R.

52—173, 237